United States Patent [19]
Dwyer

[11] Patent Number: 5,869,194
[45] Date of Patent: *Feb. 9, 1999

[54] BLANK FOR MANUFACTURING PRECISELY SHAPED PARTS

[75] Inventor: James P. Dwyer, Gilford, Conn.

[73] Assignee: United Technologies Corporation, Hartford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 641,251

[22] Filed: Apr. 30, 1996

[51] Int. Cl.⁶ .............................. B29B 7/00; B63H 1/20; B24B 41/06
[52] U.S. Cl. .................... 428/542.8; 428/156; 451/365; 269/134; 269/266; 416/248
[58] Field of Search .................................. 428/156, 192, 428/542.8; 269/138, 266, 134, 106; 451/365; 416/248, 193 A

[56] References Cited

U.S. PATENT DOCUMENTS

| | | | |
|---|---|---|---|
| 2,577,747 | 12/1951 | Gibian | 29/156.8 |
| 3,818,646 | 6/1974 | Peterson | 51/217 R |
| 4,016,683 | 4/1977 | Cretella | 51/143 |
| 4,638,602 | 1/1987 | Cavalieri | 51/217 R |
| 4,805,351 | 2/1989 | Dobson et al. | 51/217 R |
| 5,275,536 | 1/1994 | Stephens et al. | 416/248 |

FOREIGN PATENT DOCUMENTS

| | | |
|---|---|---|
| 0 436 933 A2 | 7/1991 | European Pat. Off. . |
| 1025881 | 4/1953 | France . |
| 2 238 607 | 8/1972 | Germany . |
| 2 047 897 | 12/1980 | United Kingdom . |

Primary Examiner—Donald Loney

[57] ABSTRACT

A blank for manufacturing a precisely shaped part, such as a turbine blade, generally comprises a tip, a root region longitudinally spaced from the tip, and a midspan region extending therebetween. The blank is further characterized by a sacrificial region extending substantially longitudinally from the root region, a stacking axis and a root centerline from which critical dimensions of the blade are referenced, and a plurality of locators. The first locator, a bore, being disposed at the tip on the stacking axis. The second locator, a notch, being disposed within the sacrificial region aligned with the stacking axis. The third locator, a notch, being disposed within the sacrificial region is characterized by a corner, which is parallel to the root centerline. The locators are shaped to mate with corresponding features on a fixture, such that the fixture uses the locators to securely hold the blank. Once the blank is clamped into the fixture, details, such as dove tails in the root region, can be accurately machined into the blank forming the precisely shaped part.

28 Claims, 5 Drawing Sheets

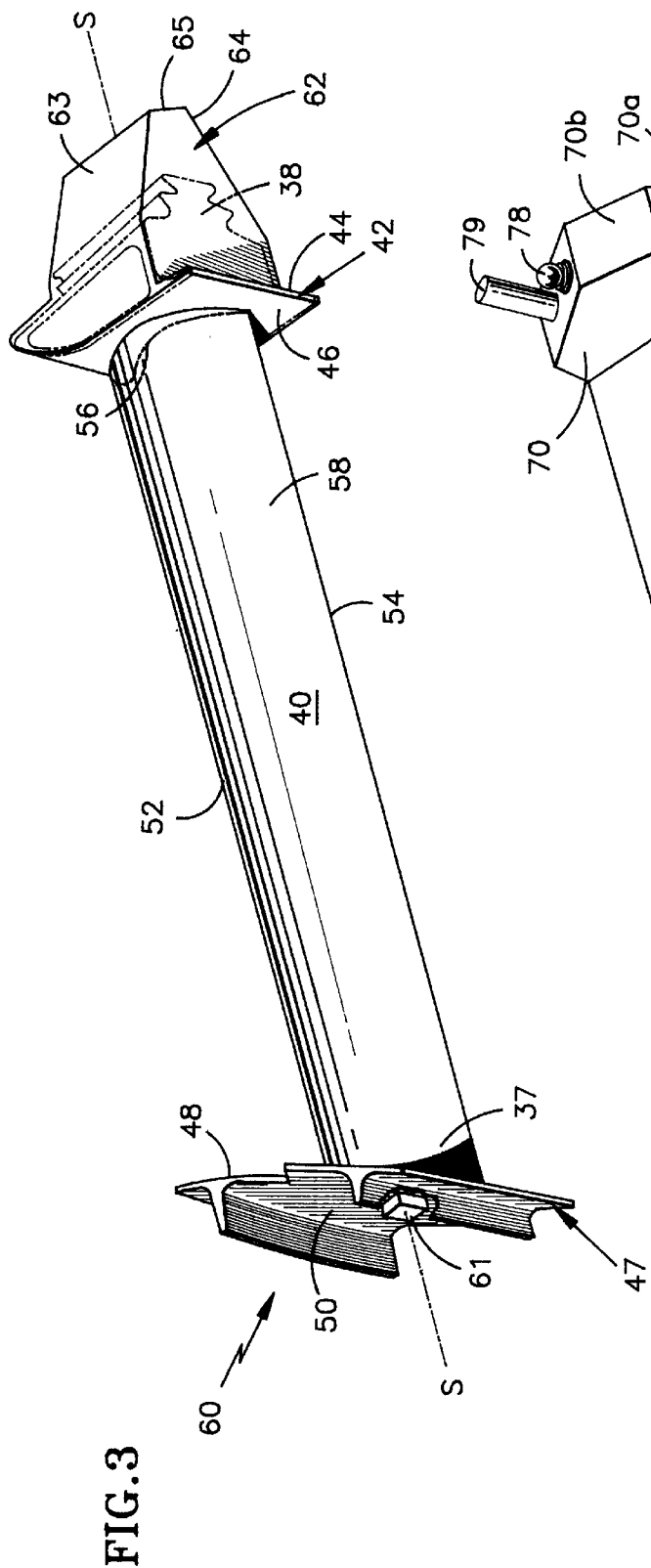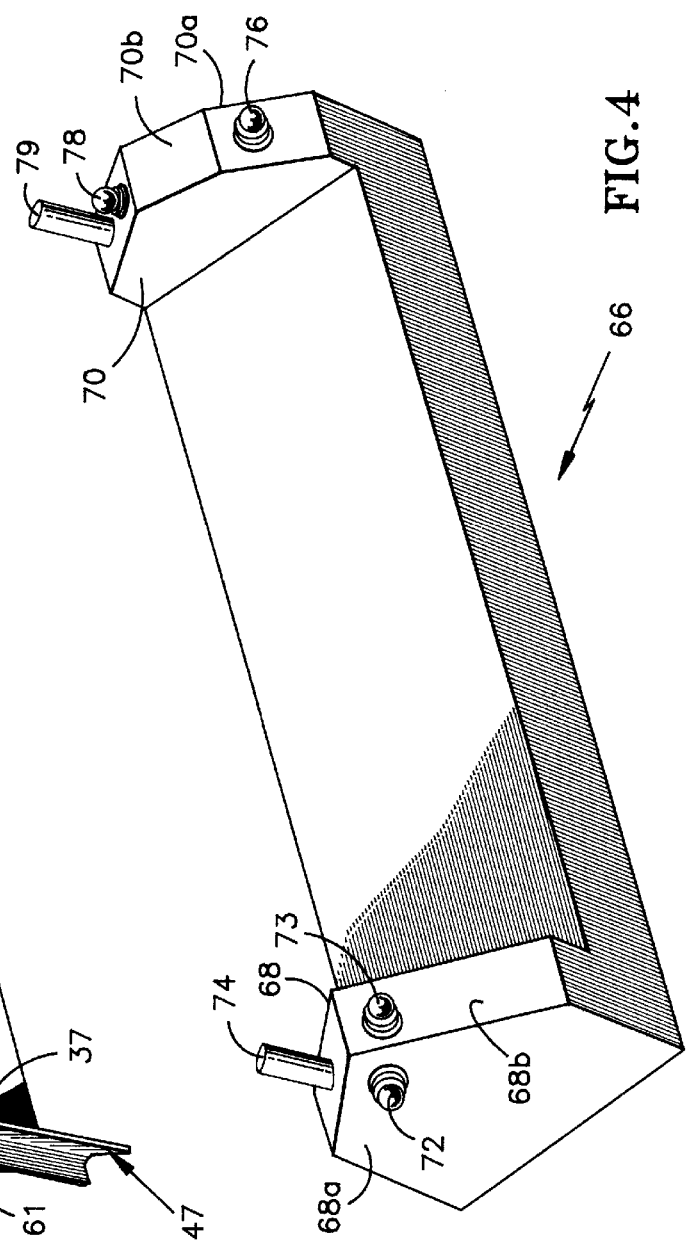

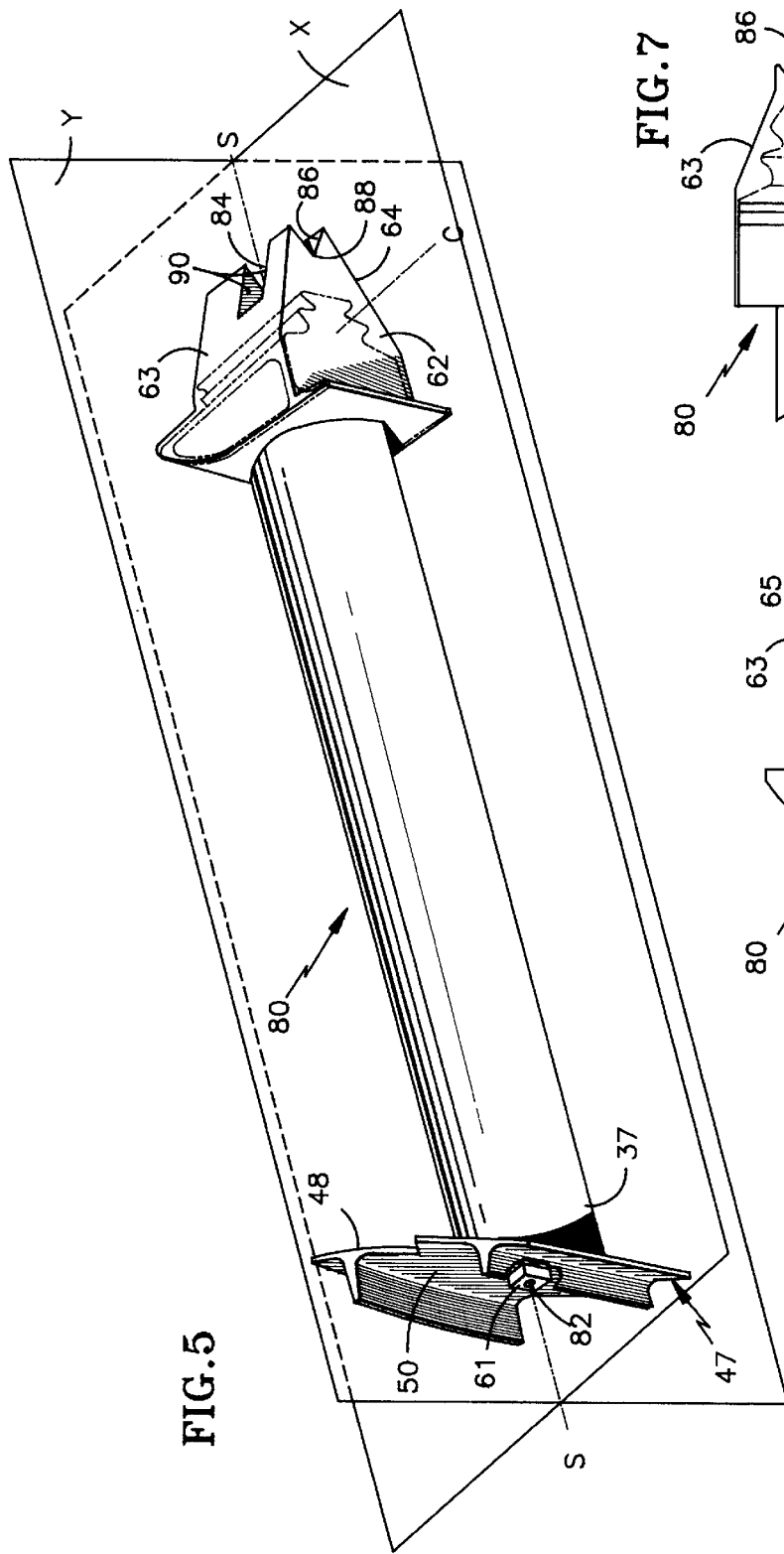
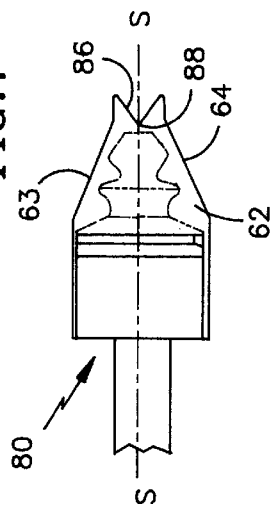
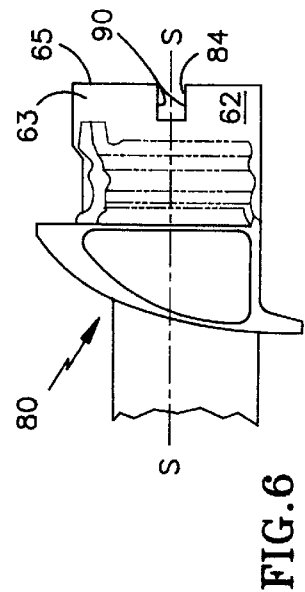

BLANK FOR MANUFACTURING PRECISELY SHAPED PARTS

TECHNICAL FIELD

The present invention relates to precisely shaped parts, and more particularly to a blank for manufacturing precisely shaped parts.

BACKGROUND OF THE INVENTION

Many industries use precisely shaped parts. For example, conventional blades for use in gas turbine engines must be precisely shaped. Typically, precision investment casting or die-forging forms a metal starting blank into a blank having a blade shape.

Generally, the blank includes a tip, a root region longitudinally spaced therefrom, and a midspan region extending between the tip and the root region. A platform typically separates the root region from the midspan region. The tip may include an attached or integral shroud. A number of details must be machined into these portions of the blank, to put the precisely shaped part is in its final configuration. For example, a plurality of dove tails must be machined into the root region. These dove tails allow the blade to be secured to the rotor disk in the engine. In order to achieve acceptable engine performance, these dove tails must be formed within small tolerances. To machine the dove tails into the blank with the necessary accuracy, there must be references from which to measure the configuration of the dove tails. The references used, dictate the type of fixture that will be used to hold the blank during machining.

There are a variety of ways to provide such references. The references may be provided as taught in U.S. Pat. No. 2,577,747 issued to Gibian. Gibian teaches forging at least two hemispherical buttons or protrusions into the blank. Both buttons are disposed on the blank along the stacking axis. Using these buttons, the root region can be ground down to a predetermined thickness, and a bore can be drilled into the opposite end of the blank. Using a lathe as the fixture, the blank is held and referenced by using the thickness of the root region and the bore, allowing machining of the leading and trailing edges of the blank.

The most significant problem with the solution taught in Gibian, is that machining the bore and the thickness of root region based on the buttons will not provide sufficiently accurate results. Another problem is that although the lathe positions the blank securely along the stacking axis by using the thickness of the root region and the bore as references, the root region of the blank cannot be machined while being held in the lathe.

References may also be provided as taught in U.S. Pat. No. 3,818,646 issued to Peterson. Peterson teaches a locating button on the root portion of the blade disposed along a design axis of the blank, such as the stacking axis. A fixture utilizes this button as a reference. While in the fixture, datum planes may be ground or machined into the root and shroud portions of the blank to define accurately located surfaces for subsequent machining.

One problem with this solution is that the fixture clamps the blank along the airfoil-shaped midspan by clamping mechanisms. As a result, the fixtures are complex and therefore expensive to design, manufacture and maintain. Furthermore, clamping along the midspan makes the fixture dependent on the size and shape of the blade. Due to this dependency a number of fixtures are necessary to make all the blades in one engine, since an engine has several different size and shaped blades. Another problem with using a blade dependent fixture is that during production, time may be wasted changing between fixtures, thus significantly limiting the number of blades that can be manufactured in a period of time.

Another possible way of providing references is by encapsulating the blank in a block of material, such as a low melt alloy. The block of material is formed around the blank, so that the root region extends from the block. The sides of the block provide reference planes from which the configuration of the dove tails or other details can be determined with the necessary accuracy. Encapsulating the blank requires a complex encapsulation tool. This encapsulation tool is time consuming to design and build, is blade dependent, and is not robust. Consequently, the encapsulation tool is costly to manufacture and maintain, and a different tool is required for each differently shaped or sized blank. In addition, in this arrangement, a complex fixture is necessary to hold the block containing the blank during machining of the blank. This fixture is also expensive to design and maintain, and is blade-length dependent. Furthermore, after machining the dove tails into the blank, the material must be melted off the blank. The material must be disposed of without causing environmental problems. In addition, any impurities remaining in the blade after encapsulation may cause the blade to crack during subsequent heat treatment or operation of the engine, so removal of the impurities is critical. This removal is accomplished by acid leeching and analyzing the blades. Acid leeching is expensive and environmentally hazardous, and this in combination with the analysis of the blades, further increases the cost of producing blades using encapsulation.

Therefore, an improved blank is sought, which provides references to accurately machine details into the blank, thus forming a precisely shaped part. The fixture for use with the blank must be inexpensive to design and maintain, and easily modifiable to accommodate different size or shape blades.

SUMMARY

According to the present invention, a blank generally includes a tip at one end, a root region longitudinally spaced therefrom, a sacrificial region extending longitudinally from the root region, and a plane. The blank further includes a plurality of locators disposed within the plane, the first locator being disposed at the tip, and the second locator being disposed within the sacrificial region. The locators are shaped to mate with corresponding features on a fixture, such that the fixture uses the locators to securely hold the blank. Once the blank is clamped into the fixture, details, such as dove tails in the root region, can be accurately machined into the blank forming a precisely shaped part. The accuracy results from disposing the locators in a plane from which critical design features are referenced. By using locators that are integral with the blank and disposed at the ends of the blank, the fixture for use during subsequent machining is simple to design and manufacture. Furthermore, the fixture can be easily modified to accommodate different size or shaped blades.

According to a particular embodiment of the blank of the present invention, the plane contains the stacking axis, the first locator is a bore, and the second locator is a notch.

According to another embodiment of the blank of the present invention, the blank includes a second plane, and a third locator disposed at the end of the sacrificial region. The second plane contains the root centerline. The third locator is a prismatic notch having a corner that is aligned with the second plane. This allows an even simpler fixture to be used.

BRIEF DESCRIPTION OF THE DRAWINGS

FIG. 3 is a perspective view of a blank of the present invention not in its final configuration.

FIG. 4 is a perspective view of a staging fixture for use in forming the blank of the present invention.

FIG. 5 is a perspective view of one embodiment of the blank of the present invention.

FIG. 6 is a partial front view of a portion of the embodiment of the blank shown in FIG. 5.

FIG. 7 is a partial top view of a portion of the embodiment of the blank shown in FIG. 5.

BEST MODE FOR CARRYING OUT THE INVENTION

Some of the subject matter herein may be disclosed and/or claimed in the following copending applications: "A Fixture for Manufacturing Precisely Shaped Parts", U.S. Ser. No. 08/640,045; "A Method for Manufacturing Precisely Shaped Parts", U.S. Ser. No. 08/993,073; and "Turbomachinery Blade or Vane With a Permanent Machining Datum", U.S. Ser. No. 08/953,129.

Figure 1:
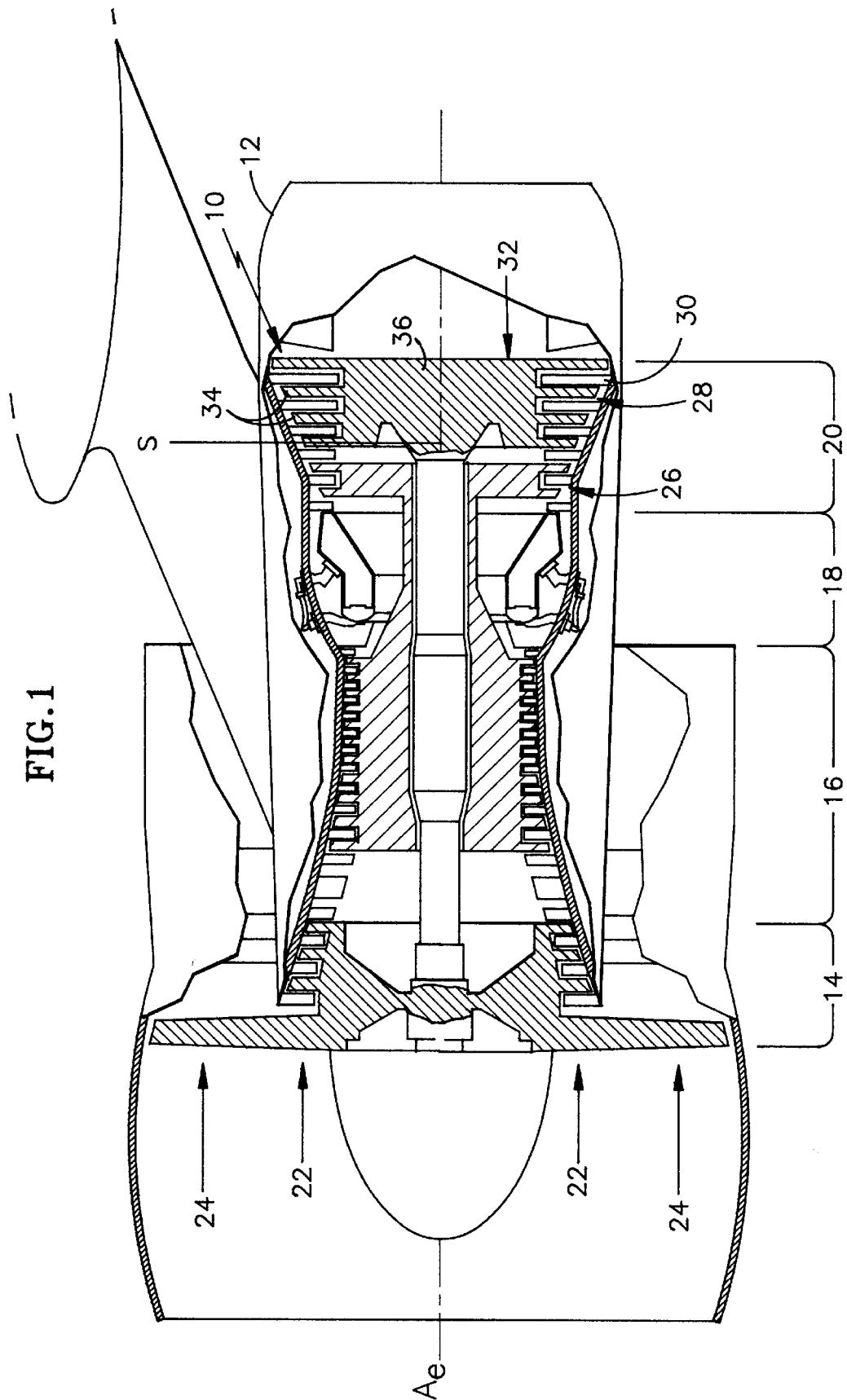
FIG. 1 is a side elevation schematic representation of an axial flow, turbofan gas turbine engine.

Referring to FIG. 1, an axial flow, turbofan gas turbine engine 10 is mounted in an aircraft nacelle 12. The nacelle 12 circumscribes the gas turbine engine 10. The engine comprises of a fan section 14, a compressor section 16, a combustor section 18, and a turbine section 20. An axis $A_e$ is centrally disposed within the engine, extending longitudinal therethrough. A primary flow path 22 for working medium gases extends longitudinally along the axis $A_e$. A secondary flow path 24 for working medium gases extends parallel to and radially outward of the primary flow path 22.

The turbine section 20 includes an upstream high pressure turbine 26 and a downstream low pressure turbine 28. For example, the low pressure turbine 28 is formed by a stator assembly 30 and a rotor assembly 32. The rotor assembly 32 has a plurality of airfoils or blades 34 which extend radially outward from a rotor disk 36 across the primary working medium flow path 22. Each blade 34 is characterized by a stacking axis S which extends perpendicular to the engine axis $A_e$.

Figure 2:
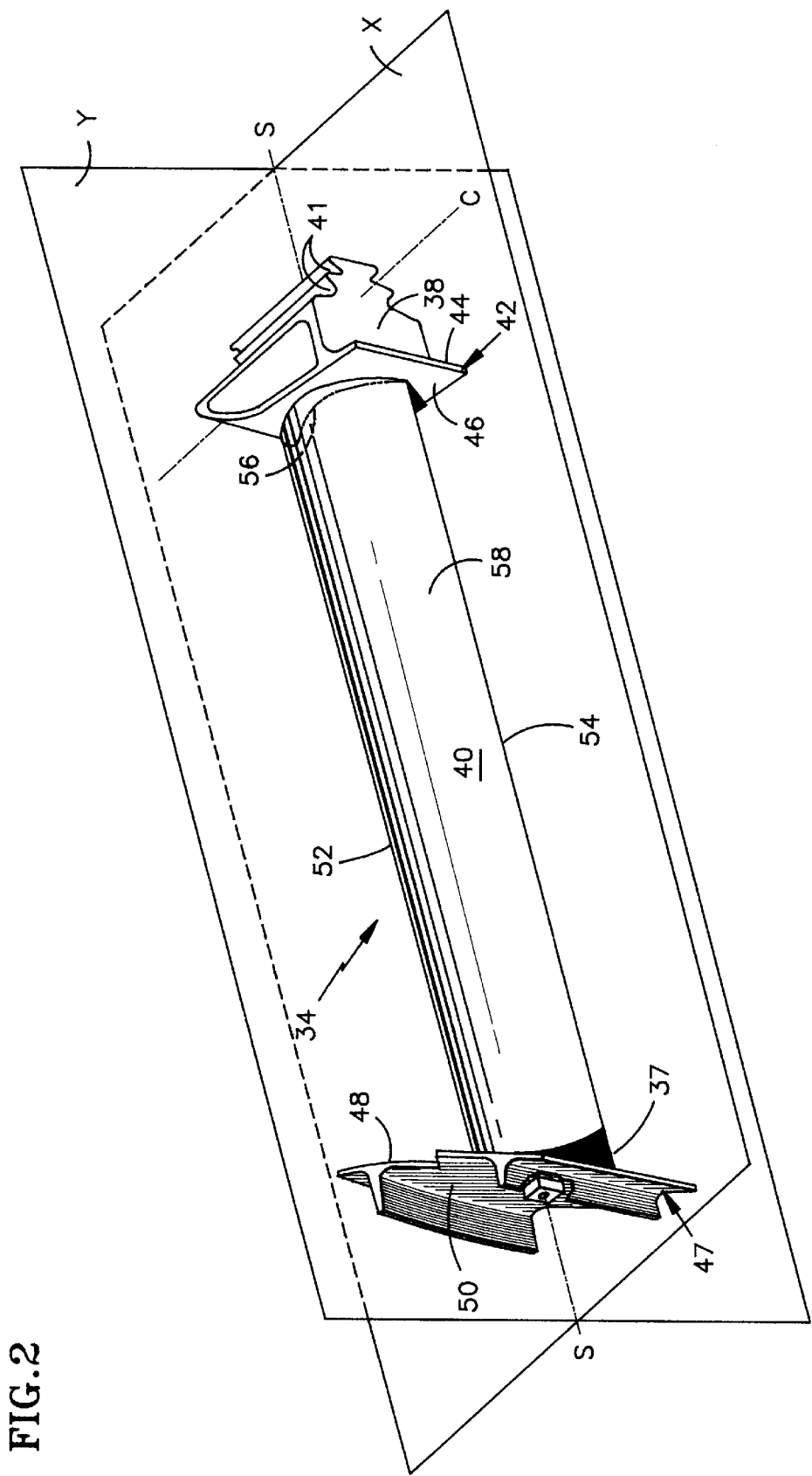
FIG. 2 is a perspective view of a turbine blade created using a blank of the present invention.

Referring to FIG. 2 the turbine blade 34 generally has a tip 37, a root region 38 longitudinally spaced from the tip 37, and a midspan region 40 extending therebetween. A platform 42 separates the midspan region 40 from the root region 38. The platform 42 has an inner surface 44 adjacent the root region 38 and an opposed outer surface 46. The tip 37 further includes an integral shroud 47. The shroud 47 has an inner surface 48 adjacent the midspan region 40, and an opposed outer surface 50. The root region 38 includes a plurality of dove tails 41 which engage with mating grooves in the rotor disk 36 (as shown in FIG. 1). The root region 38 further includes a root centerline C disposed centrally through the width of the root region 38. The midspan region includes a leading edge 52, a trailing edge 54 spaced from the leading edge, pressure surface 56, and a suction surface 58. The pressure and suction surfaces 56 and 58 extend between the leading and trailing edges 52 and 54.

The turbine blade 34 is further characterized by first and second planes Y and X, respectively. The first plane Y contains the stacking axis S. The second plane X contains the root centerline C. The first plane Y is perpendicular to the second plane X. Critical dimensions of the blade are referenced from the first and second planes.

Referring to FIG. 3, a starting blank 60 from which the turbine blade 34 (as shown in FIG. 2) is formed (as by investment casting or the like) includes a protrusion 61, and a sacrificial region 62. The protrusion 61 extends from the radially outer surface 50 of the shroud 47 and is disposed on the stacking axis S. The sacrificial region 62 extends substantially longitudinally from the root region 38 (shown in phantom). The sacrificial region 62 includes a first surface 63, a second surface 64 spaced from the first surface 63, and a third surface 65 extending between the first and second surfaces 63 and 64, respectively.

Referring to FIG. 4, an indexing fixture 66 comprises a U-shaped structure with first and second end walls 68 and 70. The indexing fixture 66 allows the blank 80 (as shown in FIG. 3) to be accurately positioned within an electron discharge machine (not shown), by locating the blank 80 with six points. Each end wall 68 and 70 includes an outer surface 68a and 70a, and an upper surface 68b and 70b, respectively. The outer surface 68a of the first end wall includes a spherical first pin 72. The upper surface 68b of the first end wall includes a spherical second pin 73 and a cylindrical third pin 74. The upper surface 70b of the second end wall includes a spherical fourth pin 76, a spherical fifth pin 78, and a cylindrical sixth pin 79.

Referring to FIGS. 3 and 4, during production the starting blank 60 is placed on the indexing fixture 66 within a conventional wire electron discharge machine. The starting blank 60 rests on the indexing fixture 66, so that the pressure surface 56 of the starting blank 60 contacts the spherical second, fourth, and fifth pins 73, 76, and 78, respectively. In addition, the leading edge 52 contacts the cylindrical third and sixth pins 74 and 79, respectively; and the inner surface 48 of the shroud 47 contacts the first pin 72.

Referring to FIG. 5, the blank 80 has first, second, and third locators 82, 84, and 86, respectively. The locators are machined into the starting blank 60 (as shown in FIG. 3) while it is positioned on the indexing fixture 66 (as shown in FIG. 4). The first locator 82, in this embodiment, is a bore drilled into the protrusion 61 using rotary electron discharge machining. The first locator is disposed within the first plane Y along the stacking axis S.

The second and third locators 84 and 86, are machined into the starting blank 60 (as shown in FIG. 3) using wire electron discharge machining. The second locator 84, in this embodiment, is a notch. Referring to FIGS. 5 and 6, the second locator 84 extends from the first surface 63 to the second surface 64 of the sacrificial region 62. In this embodiment, the second locator 84 is a rectangular notch including vertical surfaces 90. The vertical surfaces 90 are equally spaced from the stacking axis S.

The third locator 86, is a notch; in this embodiment, the notch 86, is cut from the third edge 65 (as shown in FIG. 3) of the sacrificial region 62. The third locator 86 preferably, has a feature that is parallel to the root centerline C. Referring to FIG. 5, the third locator 86 is shaped like a triangular prism with a corner 88 that is coincident with the stacking axis S and parallel to the centerline of the root region C.

Figure 8:
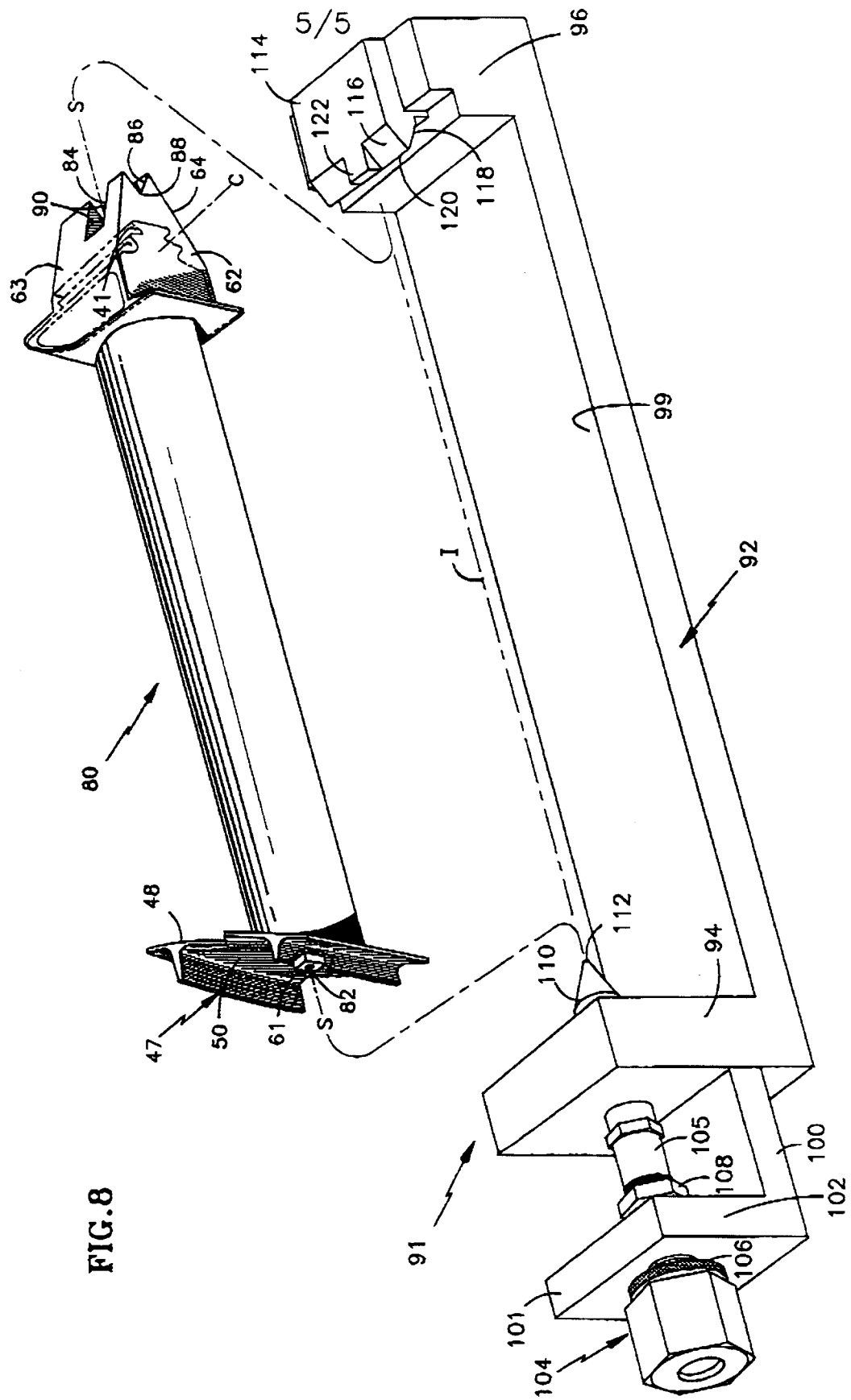
FIG. 8 is a perspective view of an embodiment of a fixture for use with the blank of the present invention.

Referring to FIG. 8, a fixture 91 for holding the blank 80 during subsequent machining includes an integral U-shaped base 92 with first and second end walls 94 and 96 spaced apart to accommodate blank 80 therebetween. The base 92 has an upper surface 99. The fixture 91 further includes an L-shaped wall structure 100 extending from the outer surface of the first end wall 94. The L-shaped wall structure 100 includes a vertical wall 102. Both the base 92 and the L-shaped wall structure support a clamping mechanism 104.

The clamping mechanism 104 includes a movable shaft 105, which extends through the vertical wall 102 and the first end wall 94. The movable shaft 105 supports the other elements of the clamping mechanism 104. The clamping mechanism 104 further includes an adjustment knob 106, a locking nut 108, and a conical pin 110. The adjustment knob 106 attaches to one end of the shaft 105, so that the shaft 105 turns as the knob 106 is turned. The locking nut 108 is threaded onto the shaft 105 between the vertical wall 102 and the first end wall 94. The locking nut 108 prevents undesired shaft rotation, when it is threaded into engagement with the wall 102. The conical pin 110 attaches to the other end of the shaft 105. The conical pin 110 extends through the first end wall 94. The conical pin 110 has a tip 112.

The fixture further includes a wedge or abutment means 114 which attaches to the second end wall 96. The wedge 114 includes upper and lower surfaces 116 and 118, which join to form an edge 120. The angle between the upper and lower surfaces 116 and 118 of the wedge 114 allows the wedge to register with the third notch 86 of the blank 80. The upper surface 116 includes a rectangular projection 122 shaped to mate with the first notch 84 of the blank 80.

The tip 112 of the conical pin 110 and the edge 120 of the wedge 114 form an insertion axis I that is parallel to the upper surface 99 of the base 92, and the projection 122 lies on the insertion axis I, so that the width of the projection 122 is equally divided on either side of the insertion axis I.

The fixture 91 attaches to the support surface within a grinding machine (not shown) using conventional methods. The blank 80 is placed between the end walls 94 and 96 of the fixture 91, so that the stacking axis S and the insertion axis I are aligned. Thus positioned, the adjustment knob 104 is actuated so that the tip 112 of the conical pin moves along the insertion axis toward end wall 96. The clamping mechanism is fully engaged with the blank when the tip 112 of the conical pin has fully engaged the first locator 82, the corner 88 of the third locator 86 mates with the edge 120 of the wedge 114, and the second locator 84 mates with the projection 122. Then, the locking mechanism 108 is engaged with the wall 102 to ensure the location of the blank does not change. In this position the stacking axis S of the blank 80 is aligned with the insertion axis I of the fixture.

The third locator 86 in combination with the wedge 114 ensures that the blank will not rotate during machining. The positioning of the wedge 93 and the conical pin 112 ensures that the insertion axis I and consequently the stacking axis of the blank once held will be parallel to the upper surface 99 of the base of the fixture, and located at a predetermined height. The second locator 84, the first locator 82, the conical pin 110, and the projection 122 ensure that the blank will not move widthwise. Where the blank does not include the third locator 86, the fixture must have components for ensuring that the stacking axis of the blank is parallel to the upper surface 99 at a predetermined height and that the blank will not rotate. Since this makes the fixture more complex, it is preferred that the blank have three locators and the fixture have the conical pin 110, wedge 114, and the projection 122.

With the blade fixedly held in the clamping fixture, the dove tails 41 (as shown in phantom) can be ground into the first surface 63 of the sacrificial region 62 using conventional grinding machine operation techniques. Since the fixture holds the blank along two planes from which critical dimensions are referenced, it is preferable to use a programmable grinding machine with the fixture. Once these dove tails are completed, the conical pin 110 is disengaged from the blank 80, and the blank 80 is rotated in the fixture so that the second surface 64 is facing upward. Then, additional dove tails can be ground into the second surface 64 of the sacrificial region 62. After this operation, additional features can be ground into the blank, such as notches in the shroud or platform. Then the sacrificial region 62 is removed, thus removing the second and third locators 84 and 86. The protrusion 61 may then be machined off of the outer surface 50 of the shroud 47.

The principal advantage of the present invention is that it allows the part to be machined with improved accuracy. This is due to having the locators integral to the blade, locating the locators within the blank on planes from which the critical dimensions are measured, and using the fixture which uses these locators directly. Thus, the blade can be more accurately machined.

Another advantage of the present invention is that it allows a simple fixture to be used during machining of details to form a precisely shaped part. Since the references for machining the details are integral with the blank, and can be used to clamp the blade by the ends, the same fixture can be used with a variety of different length parts by modifying the length of the slot. Furthermore, the shape of the blade's midspan can change without requiring a different fixture; thus, eliminating the need for a different fixture for each part number. This eliminates the associated costs and delay of designing and building a fixture for each length part. The locators provide firm engagement with the fixture and therefore simple and economical fixture clamps are sufficient to position and hold the blank. This eliminates the need for fixtures with complex clamping mechanisms. It also eliminates downtimes during production associated with changing fixtures from one part length to another.

Yet another advantage is that manufacturing turbine blades no longer requires the use of encapsulation with low melt alloy, thus eliminating the time needed to encapsulate and the expensive to design and maintain encapsulation tools, fixturing tools, and melting machines. Furthermore it eliminates the need to dispose of the low melt alloy.

Yet another advantage of the present invention is the clamping fixture is easy and inexpensive to design and manufacture, and allows clamping of the part in close proximity to the ends of the blank. Clamping the part in close proximity to the ends of the blank allows the clamping fixture to hold the part in close proximity to where the grinding of the root will take place. This results in less deflection during grinding thus lower losses of precision, and allows the clamping forces necessary to hold the blank in the fixture to be low.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. The blank can be modified by changing the geometry of the first locator from a bore other suitable features including a notch or a protrusion. If a protrusion such as a conical one is used the, the conical pin of the fixture would have to be modified to include, for example, a conical bore to receive the conical protrusion. In addition, placement of the locators may be changed, so that the same or another design reference axises or planes are used instead of the stacking axis or the root centerline. Furthermore the locators can be machined features or as-cast, which would save processing time. It is therefore contemplated that the appended claims will cover any such modifications or embodiments that fall within the true scope of the invention.

We claim:

1. A blank for use with a fixture having a clamping mechanism to form a precisely shaped part, said blank including a tip, a root region longitudinally spaced therefrom, and a plane, said blank being characterized by:
    a first locator at the tip disposed within the plane, said first locator being adapted to mate with the clamping mechanism when the blank is inserted into the fixture, and further adapted to mate with the clamping mechanism when the blank is rotated 180 degrees;
    a sacrificial region extending longitudinally from said root region; and
    a second locator formed within the sacrificial region of the blank, said second locator being disposed within the plane; wherein said blank can be clamped into the fixture using the locators.

2. The blank of claim 1, wherein the plane contains a stacking axis.

3. The blank of claim 1, wherein the plane contains a root centerline.

4. The blank of claim 1 wherein the first locator has a conical shape.

5. The blank of claim 1, wherein the first locator is a bore.

6. The blank of claim 1, wherein the second locator has a prismatic shape.

7. The blank of claim 6, wherein the second locator is a notch.

8. The blank of claim 4, wherein the plane contains a stacking axis and second locator is a prismatic shaped notch.

9. A blank for use with a fixture to form a precisely shaped part, said blank including a tip, an root region longitudinally spaced therefrom, a first plane containing a stacking axis, said blank being characterized by:
    a first locator at the tip disposed within the first plane;
    a sacrificial region extending longitudinally from said root region;
    a second locator formed within the sacrificial region of the blank; wherein said second locator has a prismatic shape.

10. The blank of claim 9, wherein the first locator has a conical shape.

11. The blank of claim 9, wherein the first locator is a bore.

12. The blank of claim 9, wherein the second locator is a notch.

13. The blank of claim 10, wherein the second locator is a notch.

14. The blank of claim 11, wherein the second locator is a notch.

15. The blank of claim 9, further comprising a third locator formed within the sacrificial region of the blank and having a prismatic shape.

16. The blank of claim 13, further comprising a third locator formed within the sacrificial region of the blank and having a prismatic shape.

17. The blank of claim 14, further comprising a third locator formed within the sacrificial region of the blank and having a prismatic shape.

18. The blank of claims 15, wherein the third locator is a notch.

19. The blank of claims 16, wherein the third locator is a notch.

20. The blank of claims 17, wherein the third locator is a notch.

21. A blank for use with a fixture to form a precisely shaped part, said blank including a tip, a root region longitudinally spaced therefrom, a first plane containing a stacking axis, and second plane containing a root centerline, said blank being characterized by:
    a bore at the tip disposed along the stacking axis;
    a sacrificial region extending longitudinally from said root region;
    a rectangular notch within the sacrificial region of the blank; said rectangular notch including vertical surfaces that are equally spaced from the stacking axis; and
    a prismatic notch within the sacrificial region of the blank; said prismatic notch including a corner that is disposed parallel to the root centerline.

22. The blank of claim 1 wherein said first locator is symmetrical in shape relative to the plane.

23. The blank of claim 22 wherein said first locator has a circular cross section.

24. The blank of claim 1 further comprising a third locator formed within the sacrificial region of the blank and having a prismatic shape.

25. The blank of claim 8 further comprising a third locator formed within the sacrificial region of the blank and having a prismatic shape.

26. A blank for use with a fixture to form a precisely shaped part, said blank including a tip, a root region longitudinally spaced therefrom, and a plane, said blank being characterized by:
    a first locator at the tip disposed within the plane, said first locator having a conical shape;
    a sacrificial region extending longitudinally from said root region; and
    a second locator formed within the sacrificial region of the blank, said second locator being disposed within the plane; wherein said blank can be clamped into the fixture using the locators.

27. The blank of claim 26 wherein the first locator is a protrusion.

28. The blank of claim 20 wherein the second locator is rectangular.

* * * * *